Aug. 25, 1931.  S. F. WILLIAMS  1,820,263
TRUCK FOR TRANSPORTING ANNULAR OBJECTS
Filed Jan. 24, 1930   2 Sheets-Sheet 1
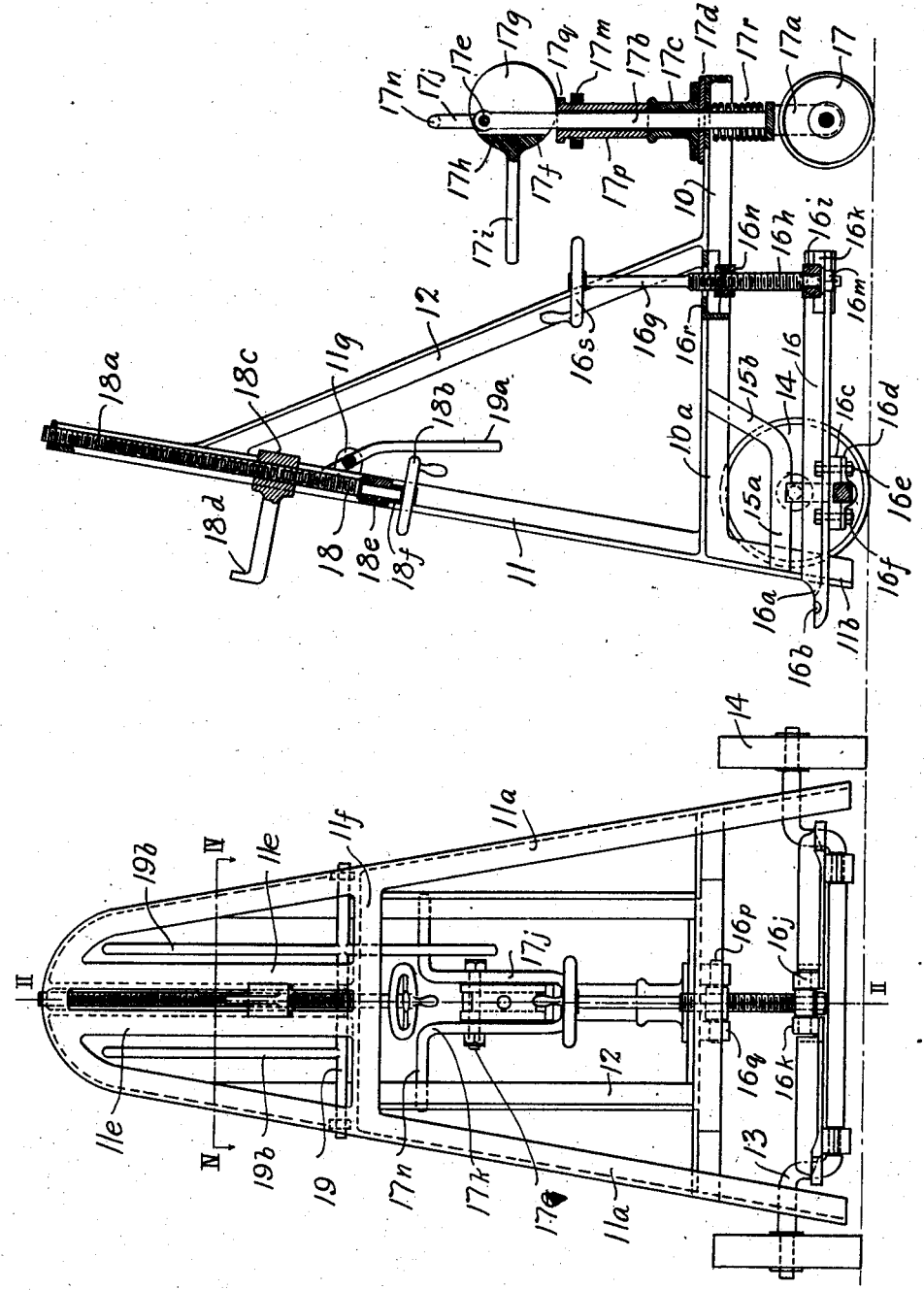
INVENTOR
Stephen F. Williams
BY
S. C. Yeaton
ATTORNEY.

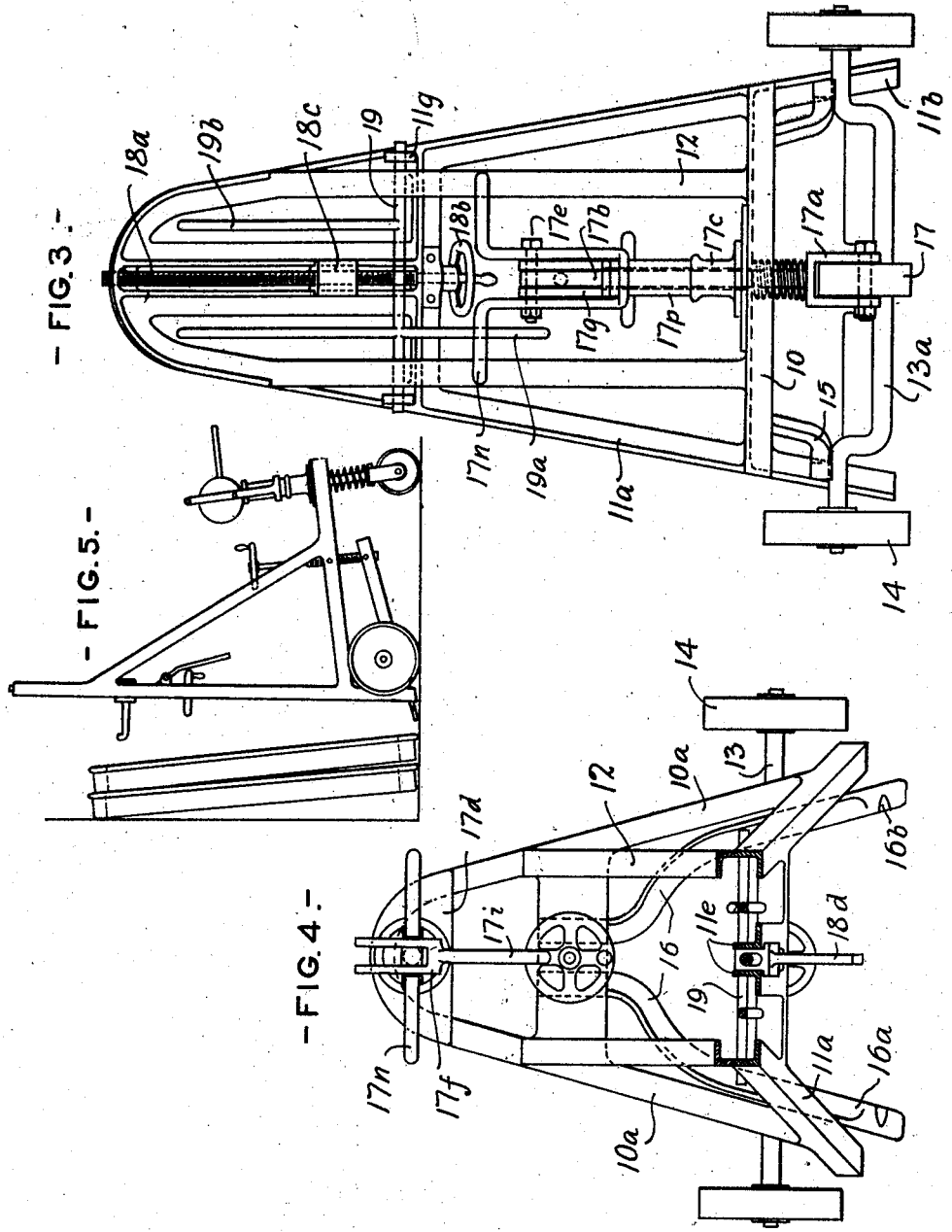

Patented Aug. 25, 1931

1,820,263

UNITED STATES PATENT OFFICE

STEPHEN FRANCIS WILLIAMS, OF MONTREAL EAST, QUEBEC, CANADA

TRUCK FOR TRANSPORTING ANNULAR OBJECTS

Application filed January 24, 1930. Serial No. 422,997.

This invention relates to trucks for transporting annular objects, and more particularly to trucks for transporting tires, such for example as those used on railroad vehicle wheels.

Heretofore in manufacturing plants, repair shops, and storage yards for railroad vehicles, it has been the usual practice, in transporting short distances, the heavy rolled steel tires used on locomotives and car wheels, for the operative to roll the tire, substantially in the manner that a child rolls a toy hoop. Because of the great weight of the tires, some of which weigh several thousand pounds, a high degree of skill, strength, and dexterity are required on the part of the operative, and occasionally the most experienced men meet with serious accidents. Many instances have occurred where the operatives have lost control of the balance of a tire and been trapped therebeneath, with consequent serious injury or loss of life.

Many plans and devices have been tried to obviate the disadvantages of the manual rolling practice, such as overhead runways, cranes, and various types of trucks, but they have all been unsuccessful, some because of mechanical difficulties, others because of the excessive loss of time, and others because of the high expense involved.

An object of the present invention is to provide a truck of simple, compact, durable, and inexpensive construction, which will enable a single operative to expeditiously load and unload tires on the truck, and transport them on the truck with a maximum of safety.

Other objects of the invention will hereinafter readily appear.

The improvement claimed is hereinafter fully set forth.

In the accompanying drawings: Figure 1 is a front end view in elevation of a truck embodying the invention; Fig. 2, a longitudinal vertical section, taken on the line II—II of Fig. 1; Fig. 3, a rear end view in elevation of the truck; Fig. 4, a horizontal section taken on the line IV—IV of Fig. 1; and Fig. 5, a diagrammatic side view showing the truck in position to receive a tire from a row thereof.

In the practice of the invention, referring to the specific embodiment thereof which has been selected for exemplification herein, the truck comprises a substantially horizontal frame 10, which will hereinafter be designated as the truck frame, and an upright frame 11, which is supported by the horizontal frame, and will hereinafter be designated as the tire frame. Both frames are formed from L-beams bent in substantially the shape of a V, so that the truck frame has two spaced side members 10a, diverging from the rear to the front of the truck, and the tire frame has two spaced side members 11a, diverging downwardly. Each of the side members 11a of the tire frame is joined to the front end of one of the side frame members 10a of the truck frame, and has a portion 11b depending therebelow. The angle between the tire frame and the truck frame is preferably made less than 90 degrees, to provide for properly disposing the center of gravity of tires carried by the truck.

To provide for properly bracing the tire frame, two L-beam braces 12 are employed, each extending from the upper part of a side member 11a of the tire frame to the rear part of one of the side members 10a of the truck frame.

To provide for supporting the forward end of the truck on an axle 13, having wheels 14, two L shape brackets 15 are employed, one leg 15a of each bracket being disposed substantially horizontal and having its forward end secured to the portion 11b of one of the side members of the tire frame, and the other leg 15b extending upwardly from the horizontal leg and having its top end secured to one of the side members 10a of the truck frame. The horizontal legs 15a of the brackets are superposed on and rigidly secured to the axle 13 by welding or other suitable means.

To provide for gripping the bottom of a tire to be transported, the axle 13 is formed with a depressed intermediate portion 13a on which are pivotally mounted a pair of substantially horizontal jaw members 16 having their front ends 16a projecting forwardly of the tire frame, and each formed with a notch 16b adapted to engage the flange of a tire.

The mounting for pivotally securing each jaw member 16 on the axle 13 comprises a block 16c, on the top of which the jaw members rest, and on the bottom of which is formed a concave groove to receive the axle; a cap plate 16d underlying the block 16c and formed with a concave groove for the axle; bolts 16e passing through the cap plate 16d, the block 16c, and the jaw member 16; and nuts 16f for clamping the parts securely together.

To provide for tilting the jaw members on their pivotal mountings so as to lower the notched ends to a position where they will pass under the flange of a tire, and to raise the notched ends so as to engage the notches with the tire flange, a spindle 16g having a screw thread 16h is employed. The lower end of the spindle is reduced in diameter and fitted to turn loosely in a collar 16i having trunnions 16j which are journalled in blocks 16k carried by the rear ends of the jaw members. A nut 16m serves to hold the collar and spindle against separation. The threaded portion of the spindle passes through a threaded collar 16n having trunnions 16p journalled in blocks 16q carried by a transverse L-beam 16r secured to the side members of the truck frame 10. A hand wheel 16s mounted on the top of the spindle serves to turn the spindle so as to effect the desired tilting of the jaw members.

To provide for tilting the tire frame forwardly into position to pick up a tire, and backwardly so as to support the tire with its center of gravity properly disposed for purposes of safe transportation, the rear end of the truck is supported on a single wheel 17 mounted in a fork 17a on the end of a spindle 17b which passes through a standard 17c mounted on a transverse plate 17d fastened to the rear end of the truck frame. The upper end of the spindle is connected by a bolt 17e to a cam member 17f, which comprises two spaced discs 17g, one on each side of the spindle, a cross portion 17h, connecting the discs together, and a handle 17i for turning the member. The bolt 17e passes through the spindle, eccentrically through the discs, and has its ends projecting beyond the discs, and each passing through the vertical bars 17j of a steering handle member 17k. The steering handle member is formed from a rod bent to provide a collar portion 17m, two spaced vertical bars 17j, and two handles 17n, each projecting at a right angle from one of the vertical bars. The collar portion 17m, is slidingly fitted on a sleeve 17p surrounding the spindle and bearing on the standard. The sleeve 17p is provided at its top with a lateral outwardly directed flange 17q on which the cam discs 17g bear. A coil spring 17r is carried by the spindle, being interposed between the head of the fork 17a and the plate 17d. From the foregoing description it will be obvious that when the cam discs are turned from the position shown in Fig. 2 of the drawings to the position shown in Fig. 5, the spring 17r will push the rear end of the truck frame upwardly, with consequent tilting the tire frame to a position for picking up a tire, and that when the cam discs are moved to the position shown in Fig. 2, the spring 17r will be compressed and the rear end of the truck frame will be lowered with consequent tilting of the tire frame to a position where the center of gravity of the received tire will be so disposed on the truck, that the truck and its load can be wheeled to any desired location with perfect safety. Steering of the truck is accomplished by moving the handles 17n so as to move the wheel 17 into different vertical planes.

To provide for locking the upper portion of the tire to the tire frame, an adjustable hook device is provided. This device comprises a spindle 18 having a screw thread 18a; a hand wheel 18b on the lower end of the spindle; a slide block 18c having a threaded opening through which the threaded portion of the spindle passes; a hook 18d secured to the slide block, and a pair of spaced vertical guides 11e for the block, which guides are secured at their top ends to the top end of the tire frame and at their bottom ends to a transverse member 11f secured to the side members 11a of the tire frame. The upper threaded end of the spindle passes through a guide bore in the top end of the tire frame and the lower end of the spindle is made of reduced diameter and passes through a bore in a block 18e secured to the transverse member 11f of the tire frame. A spacing sleeve 18f is mounted on the spindle and interposed between the block 18e and the hand wheel 18b. From the foregoing description it will be obvious that, by turning the hand wheel, the hook 18d may be lowered to permit a tire to be tilted flat against the tire frame, and raised so as to lock the upper part of the tire to the tire frame.

To provide for unloading a tire from the truck by tilting its upper end away from the truck, a leverage device is employed.

This device comprises a cross rod 19 having its ends pivotally mounted in lugs 11g secured to the side members 11a of the tire frame; a hand lever 19a, extending below the cross rod; and two spaced parallel pusher rods 19b extending above the cross rod. By referring to the drawings it will be seen that when the handle is pulled backwardly, the pusher rods 19b will tilt the upper portion of the tire away from the tire frame.

The utilization of the truck is as follows, assuming that the operative desires to transport a tire from a row of tires stacked standing on their outer peripheries in the usual manner, to another point in the plant or yard, and that the truck and its tire frames are in the positions shown in Figure 5 of the drawings: The operative first pushes the truck so that its front end is brought opposite the first tire of a row and substantially parallel therewith. He then turns the hand wheel 16s so as to tilt the jaw members 16, and lower their front ends below the flange of the tire. He then pushes the truck forwardly positioning the front ends of the jaw members underneath the tire flange, and by turning the handwheel in the reverse direction raises the front ends of the jaw members until the notches 16b thereof securely engage the tire flange. He then manually tilts the tire backwardly from the row, past vertical, and onto the tire frame. He then turns the handwheel 18b, raising the hook 18d to a position where it securely locks the tire to the tire frame. He then moves the cam handle 17i to the position shown in Figure 2, compressing the spring 17r, whereupon the truck frame will tilt downwardly tilting the tire frame backwardly, thus positioning the tire on the truck so that its center of gravity will be disposed in a transverse vertical plane well within the area of the base of the device to permit the truck to be moved with a maximum of safety. The operative then pushes the truck to the location where the tire is required for use. He then throws the cam handle 17i to the position shown in Figure 5, whereupon the spring 17r will tilt the truck frame upwardly, with consequent tilting of the tire frame to the position shown in Figure 5. He then turns the handwheel 18b, disengaging the hook 18d from the tire. He next pulls on the hand lever 19a, causing the pusher rods 19b to tilt the top of the tire away from the frame. He then turns the handwheel 16s, freeing the notches 16b from the flange of the tire, whereupon the truck may be moved away to pick up another tire.

While one of the preferred forms of construction has been shown, it is obvious that many variations in procedure, form, arrangement and construction of the parts can be made, and the invention is not therefore limited to the particular embodiment disclosed, but includes such changes and modifications as come within the spirit and scope of the invention as set forth in the appended claims.

The invention claimed and desired to be secured by Letters Patent is:

1. A truck for transporting, in a substantially upright position, metal tires for wheels, comprising a frame having a part extending longitudinally of the truck, and an upstanding part at one end of the longitudinal part and rigidly connected thereto, against the outer face of which upstanding part the tire rests when being transported; a pair of parallel, aligned wheels revolubly mounted one at each side of said longitudinal part near the end at which the upstanding part is disposed, the axis of said wheels forming a fulcrum about which both parts may be tilted as a unit to bring the upstanding part to a tire loading position and to a tire transporting position; a support comprising a wheel, for the frame at the end of the longitudinal part remote from the upstanding part; and means operatively associated with said support operative to raise and lower said remote end whereby said parts are titled as a unit and the upstanding part moved to its said two positions.

2. A truck for transporting, in a substantially upright position, metal tires for wheels, comprising a frame having a part extending longitudinally of the truck, and an upstanding part at one end of the longitudinal part and rigidly connected thereto, against the outer face of which upstanding part the tire rests when being transported; a pair of parallel, aligned wheels revolubly mounted one at each side of said longitudinal part near the end at which the upstanding part is disposed, the axis of said wheels forming a fulcrum about which both parts may be titled as a unit to bring the upstanding part to a tire loading position and to a tire transporting position; a support, comprising a wheel, for the frame at the end of the longitudinal part remote from the upstanding part; means operatively associated with said support operative to raise and lower said remote end whereby said parts are titled as a unit and the upstanding part moved to its said two positions; and means for detachably locking a tire to said upstanding part.

3. A truck for transporting, in a substantially upright position, metal tires for wheels, comprising a frame having a part extending longitudinally of the truck, and an upstanding part at one end of the longitudinal part and rigidly connected thereto, against the outer face of which upstanding part the tire rests when being transported; a pair of parallel, aligned wheels revolubly mounted one at each side of said longitudinal part near the end at which the upstanding part is disposed, the axis of said wheels forming a fulcrum about which both parts may be tilted as a unit to bring the upstanding part to a tire loading position and to a tire transporting position; a support, comprising a wheel, for the frame at the end of the longitudinal part remote from the upstanding part; means operatively associated with said support operative to raise and lower said remote end whereby said parts are tilted as a unit and the upstanding part moved to its said two positions; and means operatively engaged with said upstanding part for tilting a tire away from said upstanding part.

4. A truck for transporting, in a substantially upright position, metal tires for wheels, comprising a frame having a part extending longitudinally of the truck, and an upstanding part at one end of the longitudinal part and rigidly connected thereto against the outer face of which upstanding part the tire rests when being transported; a pair of parallel, aligned wheels revolubly mounted one at each side of said longitudinal part near the end at which the upstanding part is disposed, the axis of said wheels forming a fulcrum about which both parts may be tilted as a unit to bring the upstanding part in a tire loading position and a tire transporting position; a support, comprising a wheel, for the frame at the end of the longitudinal part remote from the upstanding part; means operatively associated with said support operative to raise and lower said remote end whereby said parts are tilted as a unit and the upstanding part moved to its said two positions; means for detachably locking a tire to said upstanding part; and means for tilting a tire away from said upstanding part.

5. In a truck for transporting tires, the combination of a truck frame; wheels for supporting the truck frame, said frame being adapted to pivot about the axis of said wheels; a tire supporting frame secured to the truck frame; a support for said truck frame at an end thereof remote from said axis; and means for raising and lowering said end relative to said support for pivotally moving said truck frame about said axis to effect tilting of the tire supporting frame.

6. In a truck for transporting tires, the combination of a truck frame; a pair of aligned wheels for supporting the truck frame, said frame being adapted to pivot about the axis of said wheels; an upright tire supporting frame secured to the truck frame; a support for said truck frame at one end therof remote from said axis; means operably engaged with said end and said support for raising and lowering said end relative to said support for pivotally moving said frame about said axis; and means on said supporting frame adapted to tilt a tire away from said tire supporting frame.

7. In a truck for transporting tires, the combination of a truck frame; a pair of aligned wheels for supporting the truck frame, said frame being adapted to pivot about the axis of said wheels; a support for said truck frame at one end thereof remote from said axis; an upright tire supporting frame secured to the truck frame; means operably disposed at said remote end of the truck frame adapted to raise and lower said end relative to said support for pivotally moving said frame about said axis to effect tilting of the tire supporting frame; and means on said supporting frame comprising a lever for tilting a tire away from said supporting frame.

8. In a truck for transporting tires, the combination of a truck frame; wheels for supporting the truck frame; an upright tire supporting frame secured to the truck frame at one end thereof; a support for said truck frame at the end thereof remote from said axis; means for raising and lowering said end relative to said support for pivotally moving said truck frame about said axis to effect tilting of the supporting frame; and means on said supporting frame and said truck frame for detachably locking a tire to the tire supporting frame.

9. In a truck for transporting tires, the combination of a truck frame; wheels for supporting the truck frame; an upright tire supporting frame secured to the truck frame at one end thereof; means carried by the truck frame at the end remote from said supporting frame adapted to raise and lower said truck frame about the axis of the wheels to effect tilting of the tire supporting frame; and means secured on said frames for detachably locking a tire to the tire supporting frame.

10. In a truck for transporting tires, the combination of a truck frame; wheels for supporting the truck frame; an upright tire supporting frame at one end thereof secured to the truck frame; means carried by the truck frame at the end remote from said supporting frame adapted to raise and lower said truck frame about the axis of the wheels to effect tilting of the tire supporting frame; means operably disposed on said frames for detachably locking a tire to the tire supporting frame; and means on said tire supporting frame for tilting a tire away from the same.

11. In a truck for transporting tires, the combination of a truck frame; wheels for supporting the truck frame; an upright tire supporting frame secured to the truck frame at one end thereof and disposed at an angle thereto, transversely thereof and projecting thereabove; a support at the end of the truck frame remote from said supporting frame; and means for raising and lowering said end of the truck frame relative to said support to pivotally move said truck frame about the axis of said wheels to effect tilting of the tire supporting frame.

12. In a truck for transporting tires, the combination of a truck frame; wheels for supporting the truck frame; an upright tire supporting frame secured to the truck frame at one end thereof and disposed at an angle thereto, transversely thereof, and projecting thereabove; a support for said truck frame at an end thereof remote from said supporting frame; means engaging said remote end of the truck frame adapted to raise and lower the same relative to the support to effect tilting of the tire supporting frame; and means operably mounted on said supporting frame for tilting a tire away from the said supporting frame.

13. In a truck for transporting tires, the combination of a truck frame; wheels for supporting the truck frame; an upright tire supporting frame secured to the truck frame at one end thereof and disposed at an angle thereto, transversely thereof, and projecting thereabove; a support at the end of said truck frame remote from said supporting frame; means at said remote end of the truck frame for raising and lowering the same relative to said support to effect tilting of the tire supporting frame; and means operably engaged with said truck frame and said supporting frame for detachably locking a tire to the tire supporting frame.

14. In a truck for transporting tires, the combination of a truck frame; wheels supporting the truck frame at the front end thereof; an upright tire supporting frame mounted on the front end of the truck frame; a support at the rear end of the truck frame; means engaged with said rear end for raising and lowering the same relative to said support to effect tilting of the tire supporting frame; means operably engaged with said truck frame for detachably fastening the lower portion of a standing tire to the tire supporting frame; and adjustable means carried on said supporting frame for detachably fastening the upper portion of the tire to the same.

15. In a truck for transporting tires, the combination of a truck frame; wheels mounted on an axle supporting the truck frame; a tire supporting frame mounted on the front end of the truck frame; a pair of jaws pivotally connected to said axle and having notches for engaging the outer periphery of a tire standing on its outer periphery; and means operably disposed on said truck frame connected to said jaws and adapted to move the jaws to one position to dispose the notches thereof below the outer periphery adjacent the bottom of the tire, and to move the jaws to another position where the notches thereof will lockingly engage the periphery of the tire.

16. In a truck for transporting tires, the combination of a truck frame; an upright tire supporting frame mounted on the front end of the said truck; a pair of wheels supporting the front end of the truck frame; a single swivelly mounted rear wheel supporting the rear end of the truck frame; means for swivelling the rear wheel to steer the truck; means disposed at the said rear end of the truck frame for raising and lowering the rear end of the truck with relation to the rear wheel to pivotally move the truck frame about the axis of the said pair of wheels to effect tilting of the said supporting frame, said means comprising a cam for effecting said downward movement and a spring for effecting said upward movement; and means operably engaged with said truck frame and said supporting frame for detachably locking a tire to the tire supporting frame.

17. A truck for transporting, in a substantially upright position, metal tires for wheels comprising a frame having, a part extending longitudinally of the truck, and an upstanding part at one end of the longitudinal part against the outer face of which the tire rests when being transported; a pair of parallel aligned wheels revolubly mounted one at each side of said longitudinal part near the end at which the upstanding part is disposed; a lever extending longitudinally of the truck, fulcrumed near the base of the upstanding part, having a relatively short arm extending beyond the front face of the upstanding part, serving as a support for the tire, and a relatively long arm extending in the opposite direction; and means carried by the frame and engaging the outer end of said long arm for raising and lowering said end whereby said short arm may be brought into and removed from engagement with the under side of a tire.

18. A truck for transporting, in a substantially upright position, metal tires for wheels comprising a frame having, a part extending longitudinally of the truck, and an upstanding part at one end of the longitudinal part against the outer face of which the tire rests when being transported; a pair of parallel aligned wheels revolubly mounted one at each side of said longitudinal part near the end at which the upstanding part is disposed; a lever extending longitudinally of the truck, fulcrumed near the base of the upstanding part, having a relatively short arm extending beyond the front face of the upstanding part serving as a support for the tire, and a relatively long arm extending in the opposite direction; means carried by the frame and engaging the free end of said long arm for raising and lowering said end whereby said short arm may be brought into and removed from engagement with the under side of a tire; a support for the frame at the end of the longitudinal part remote from the upstanding part; and means for further tilting the short arm upwardly to raise the tire and for tilting the upright part toward said support to increase the portion of weight of the tire carried by said upright part to thereby increase the stability of the load.

STEPHEN FRANCIS WILLIAMS.